(12) United States Patent
Mun

(10) Patent No.: US 7,953,999 B2
(45) Date of Patent: May 31, 2011

(54) SEMICONDUCTOR INTEGRATED CIRCUIT DEVICE AND METHOD OF OPERATING THE SAME

(75) Inventor: Joo Hyung Mun, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 797 days.

(21) Appl. No.: 11/941,169

(22) Filed: Nov. 16, 2007

(65) Prior Publication Data

US 2008/0189453 A1     Aug. 7, 2008

(30) Foreign Application Priority Data

Feb. 6, 2007 (KR) .................. 10-2007-0012158

(51) Int. Cl.
    G06F 1/00    (2006.01)
    G06F 1/04    (2006.01)
    G06F 13/36   (2006.01)
(52) U.S. Cl. ................ 713/500; 713/600; 710/306
(58) Field of Classification Search .............. 713/400, 713/500, 600
    See application file for complete search history.

(56) References Cited

U.S. PATENT DOCUMENTS

| | | | | |
|---|---|---|---|---|
| 5,434,996 A | * | 7/1995 | Bell | ......................... 713/400 |
| 6,064,626 A | * | 5/2000 | Stevens | ................... 365/233.1 |
| 6,112,307 A | | 8/2000 | Ajanovic et al. | |
| 6,633,944 B1 | * | 10/2003 | Holm et al. | .................. 710/306 |
| 6,633,994 B1 | * | 10/2003 | Hofmann et al. | ........... 713/600 |
| 6,910,088 B2 | * | 6/2005 | LaBerge | ....................... 710/117 |
| 7,334,073 B2 | * | 2/2008 | Choi et al. | ................... 710/315 |
| 7,500,042 B2 | * | 3/2009 | Kadota | ....................... 710/306 |
| 2003/0149826 A1 | * | 8/2003 | Kadota | ....................... 710/306 |
| 2006/0080492 A1 | * | 4/2006 | Choi et al. | ................... 710/315 |

FOREIGN PATENT DOCUMENTS

| | | |
|---|---|---|
| JP | 08-234864 | 9/1996 |
| JP | 2002-014914 | 1/2002 |
| JP | 2002-082904 | 3/2002 |
| JP | 2003-228549 | 8/2003 |

* cited by examiner

Primary Examiner — Suresh K Suryawanshi
(74) Attorney, Agent, or Firm — Volentine & Whitt, PLLC

(57) ABSTRACT

A semiconductor integrated circuit device is provided. The semiconductor integrated circuit device includes a central processing unit (CPU) configured to output first control signals in response to a first clock signal, a first bus connected to the CPU, a bridge circuit connected to the first bus, a second bus connected to the bridge circuit, a plurality of peripheral circuits connected to the second bus, and a clock monitor connected to the first bus or the second bus and configured to output a register value corresponding to a second clock signal to the bridge circuit. The bridge circuit receives the first control signals, generates second control signals based on the register value, and outputs the second control signals to one of the peripheral circuits via the second bus.

14 Claims, 6 Drawing Sheets

SEMICONDUCTOR INTEGRATED CIRCUIT DEVICE AND METHOD OF OPERATING THE SAME

CROSS-REFERENCE TO RELATED PATENT APPLICATION

This application claims priority under 35 U.S.C. §119 from Korean Patent Application No. 10-2007-0012158, filed on Feb. 6, 2007, the disclosure of which is hereby incorporated by reference herein in as if set forth in its entirety.

BACKGROUND OF THE INVENTION

1. Field of the Invention

The present invention relates to a semiconductor integrated circuit device, and more particularly but not by way of limitation, to a semiconductor integrated circuit device including a bridge circuit configured to output an integrated control signal in synchronization with a frequency-divided clock signal, and a method of performing the same.

2. Description of the Related Art

Semiconductor integrated circuit (IC) devices usually include a central processing unit (CPU) and multiple peripheral circuits. The CPU and the peripheral circuits typically operate at different operating frequencies. Accordingly, the semiconductor integrated circuit devices include a main bus, e.g., an advanced high-performance bus (AHB), to which elements operating at a fast operating frequency are connected, and a peripheral bus, e.g., an advanced peripheral bus (APB), to which elements operating at a slow operating frequency are connected.

Generally, the CPU, a bus master, and a memory device, which are essential to a semiconductor integrated circuit device, are connected to the main bus. A universal asynchronous receiver/transmitter (UART), a timer, and an analog-to-digital converter (ADC) are selectively connected to the peripheral bus according to the usage of the semiconductor integrated circuit device.

The peripheral circuits receive a main clock signal used in the CPU, divide it according to their operating frequencies, and synchronize control signals output from the CPU with the frequency-divided clock signals. Accordingly, as the number of peripheral circuits increases, control signals for controlling the peripheral circuits become increasingly diverse and complicated. In addition, when the peripheral circuits are reused in a different system, they need to be modified so as to generate a clock signal required by the system. As a result, reusability of the peripheral circuits may be decreased.

Therefore, a method of integrating control signals for multiple peripheral circuits is desired.

SUMMARY OF THE INVENTION

Some embodiments of the present invention provide a semiconductor integrated circuit device for integrating control signals for controlling peripheral circuits included in the semiconductor integrated circuit device according to a frequency-divided clock signal, thereby increasing reusability of the peripheral circuit, and a method of operating the semiconductor integrated circuit device.

According to some embodiments of the present invention, there is provided a bridge circuit. The bridge circuit includes: a first interface block configured to interface with a first bus; a second interface block configured to interface with a second bus: a clock detection block configured to receive and decode a register value corresponding to a frequency-divided clock signal and to generate a state control signal based on the decoded register value; and a state machine coupled to the first interface block, the second interface block and the clock detection block, the state machine configured to receive first control signals via the first interface block and to generate second control signals having a clock frequency corresponding to the register value based on the state control signal.

According to some embodiments of the present invention, there is provided a semiconductor integrated circuit device. The semiconductor integrated circuit device includes: a central processing unit (CPU) configured to output first control signals in response to a first clock signal; a first bus connected to the CPU; a bridge circuit connected to the first bus; a second bus connected to the bridge circuit; at least one peripheral circuit connected to the second bus; and a clock monitor connected to one of the first bus and the second bus, the clock monitor configured to output a register value corresponding to a second clock signal to the bridge circuit, the bridge circuit being configured to receive the first control signals, generate second control signals based on the register value, and output the second control signals to one of the at least one peripheral circuit via the second bus.

According to some embodiments of the present invention, there is provided a synchronization method. The method includes: generating first control signals in response to a first clock signal; generating a second clock signal based on the first clock signal and a predetermined divisor; generating a register value based on the second clock signal; and outputting second control signals based on the register value and the first control signals.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
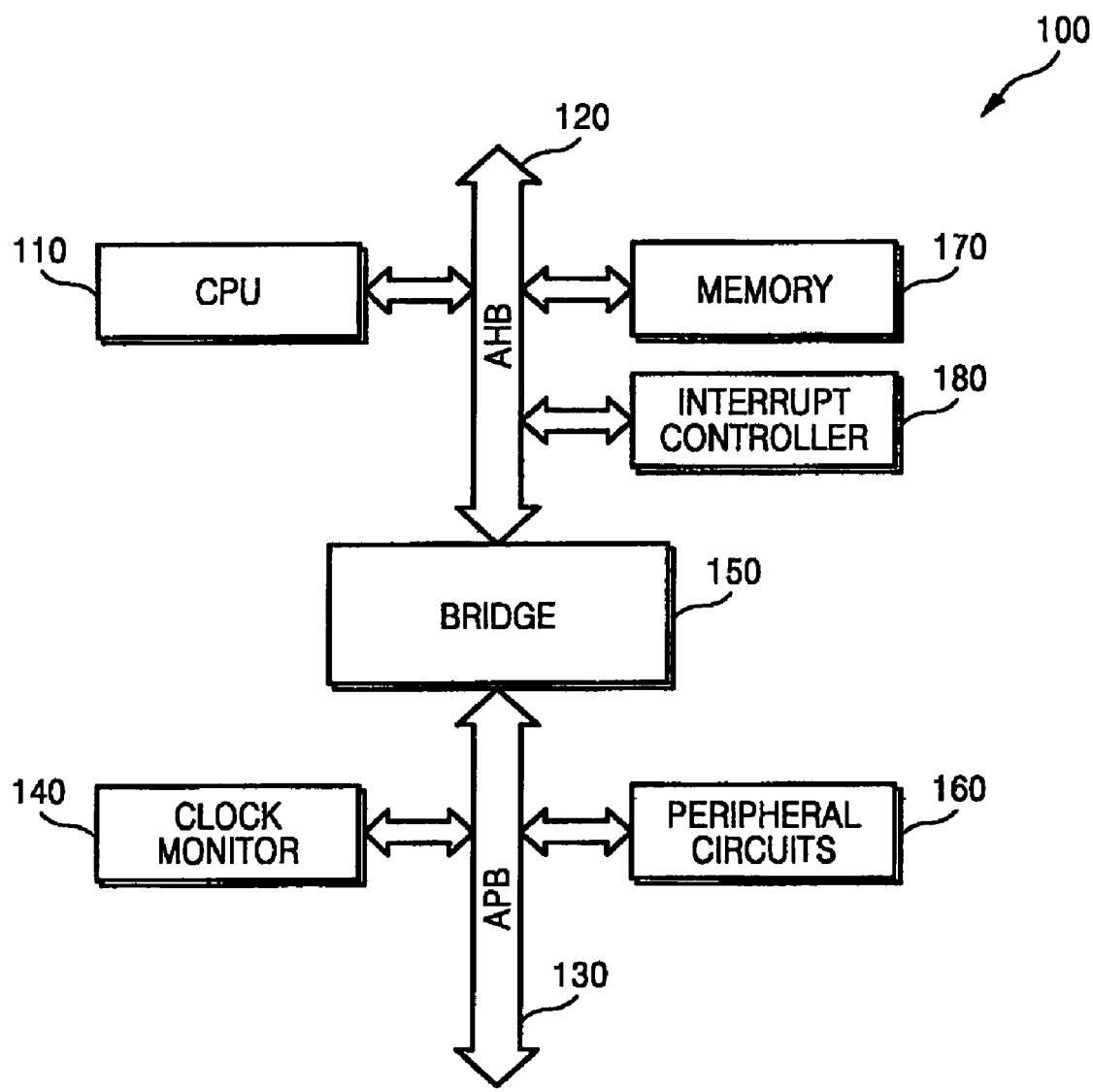
FIG. 1 is a block diagram of a semiconductor integrated circuit device according to some embodiments of the present invention.

FIG. 1 is a block diagram of a semiconductor integrated circuit device 100 according to some embodiments of the present invention. The semiconductor integrated circuit device 100 includes a central processing unit (CPU) 110, a first bus 120, a second bus 130, a clock monitor 140, a bridge circuit 150, peripheral circuits 160, a memory 170 and an interrupt controller 180. The CPU 100, memory 170, and interrupt controller 180 are coupled to the first bus 120. The clock monitor 140 and peripheral circuits 160 are coupled to the second bus 130. The bridge 150 couples the first bus 120 to the second bus 130.

In operation, the CPU 110 outputs multiple control signals for controlling the semiconductor integrated circuit device 100 in response to a first clock signal. The multiple control signals include first control signals for controlling the peripheral circuits 160.

The first bus 120 transmits the multiple control signals output from the CPU 110 to elements, e.g., the memory block 170 and the interrupt controller 180, which may be connected to the first bus 120 or the bridge circuit 150. The second bus 130 transmits control signals for controlling the peripheral circuits 160, which are received via the bridge circuit 150, to the corresponding peripheral circuits 160. The second bus 130 also transmits data output from the peripheral circuits 160 to the bridge circuit 150. The first bus 120 may be, for example, an advanced high-performance bus (AHB) or an advanced system bus (ASB). The second bus 130 may be an advanced peripheral bus (APB). The first bus 120 has a faster operating speed than the second bus 130.

The clock monitor 140 outputs to the bridge circuit 150 a first clock signal HCLK based on a clock control signal output from the CPU 110 and a second clock signal obtained by dividing the first clock signal at a predetermined division ratio. The clock control signal is provided to determine the division ratio of the first clock signal to the second clock signal.

In addition, the clock monitor 140 generates a register value CLK_DIV corresponding to the division ratio of the first clock signal to the second clock signal and outputs it to the bridge circuit 150. For instance, when the division ratio is 2, 4, 8, or 16, the clock monitor 140 generates and outputs "00", "01", "10", or "11", respectively, as the register value CLK_DIV. The clock monitor 140 may be connected to the first bus 120 or the second bus 130 (as illustrated in FIG. 1), according to design choice.

The bridge circuit 150 is provided between the first bus 120 and the second bus 130. The bridge circuit 150 generates second control signals based on the first control signals received via the first bus 120 and the register value CLK_DIV output from the clock monitor 140. The bridge circuit 150 outputs the second control signals to one of the peripheral circuits 160. The first control signals have a faster operating frequency than the second control signals. The second control signals include a peripheral circuit selection signal PSEL for selecting one of the peripheral circuits 160, a strobe signal PENABLE for controlling input/output of the peripheral circuits 160, an address signal PADDR for indicating a position of a register related with data storage in the selected peripheral circuit, and a peripheral circuit read/write control signal PWRITE.

The peripheral circuits 160 are connected to the second bus 130 and operate in response to the second control signals. The peripheral circuits 160 may include, for example, a universal asynchronous receiver/transmitter (UART), a timer, and/or an analog-to-digital converter (ADC).

Figure 2:
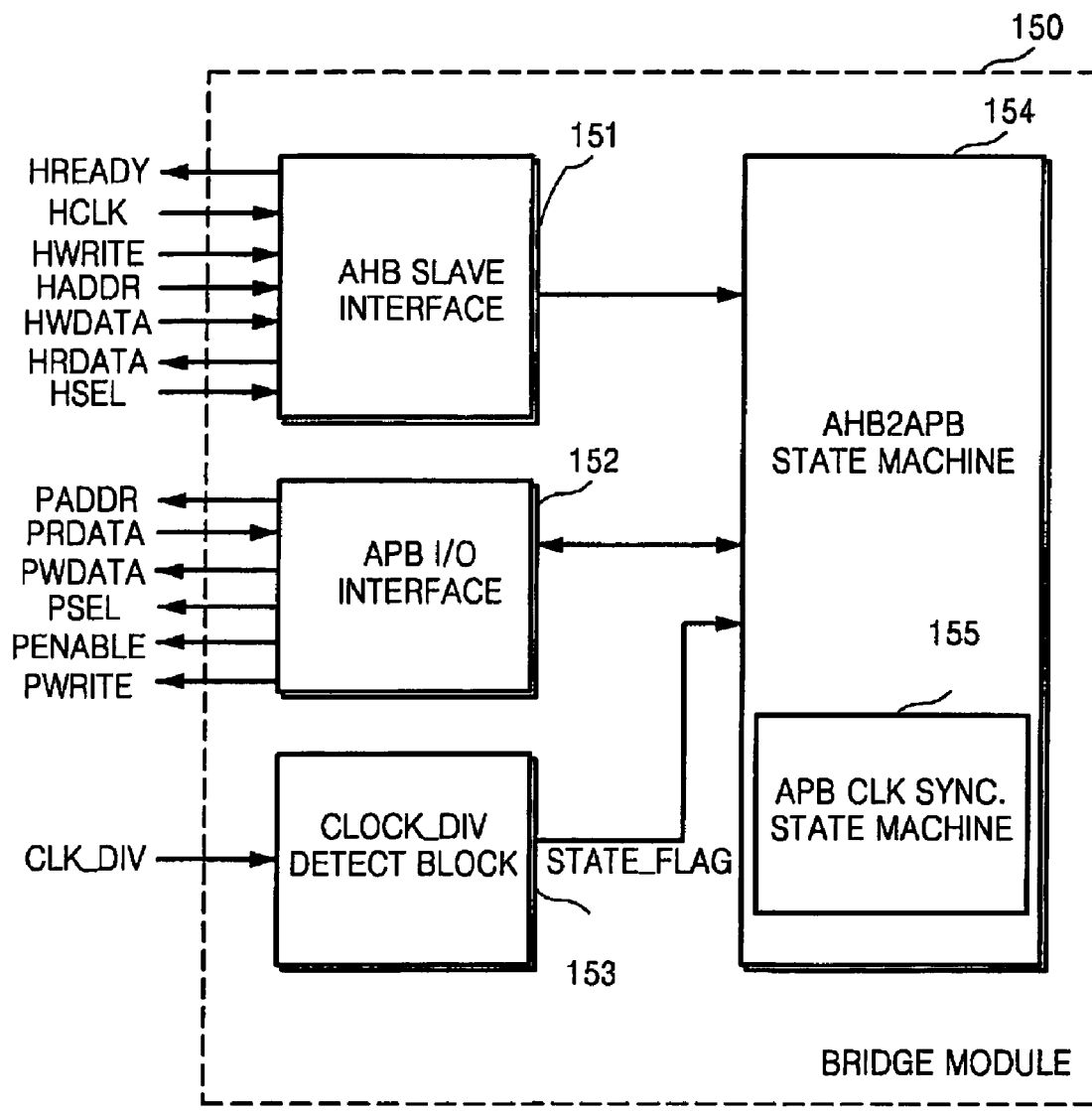
FIG. 2 is a block diagram of the bridge circuit illustrated in FIG. 1, according to some embodiments of the present invention.

FIG. 2 is a block diagram of the bridge circuit 150 illustrated in FIG. 1, according to some embodiments of the present invention. Referring to FIGS. 1 and 2, the bridge circuit 150 includes a first interface block 151 (referred to in FIG. 2 as the "AHB slave interface"), a second interface block 152 (referred to in FIG. 2 as the "APB I/O interface"), a clock detection block 153, and a state machine 154. Each of the first interface block 151, the second interface block 152, and the clock detection block 153 are coupled to the state machine 154.

The first interface block 151 outputs a signal HREADY indicating that the bridge circuit 150 is in a ready state to the CPU 110 and outputs first control signals HCLK, HADDR, HWRITE, and HSEL, which are received through interface with the first bus 120, to the state machine 154. In addition, the first interface block 151 outputs data HWDATA to be written to the peripheral circuits 160 to the state machine 154, and outputs data HRDATA read from the peripheral circuits 160 to the CPU 110.

The second interface block 152 interfaces with the second bus 130 to output the second control signals PADDR, PSEL, PENABLE, and PWRITE and write data PWDATA to the selected peripheral circuit based on a state control signal output from the state machine 154 and receive read data PRDATA output from the peripheral circuits 160 in response to a first level (e.g., "0") of the peripheral circuit read/write control signal PWRITE. The bridge circuit 150 performs a read operation in response to the first level (e.g., "0") of the peripheral circuit read/write control signal PWRITE and performs a write operation in response to a second level (e.g., "1") of the peripheral circuit read/write control signal PWRITE.

The clock detection block 153 receives the register value CLK_DIV corresponding to the second clock signal, which is a frequency-divided clock signal output from the clock monitor 140, decodes the register value CLK_DIV, and generates a state flag bit STATE_FLAG based on a decoded register value.

The state machine 154 generates the second control signals PADDR, PSEL, PENABLE, and PWRITE having an operating frequency corresponding to the register value CLK_DIV based on the first control signals HCLK, HADDR, HWRITE, and HSEL received via the first interface block 151 and the state flag bit STATE_FLAG. The state machine 154 includes a clock synchronous state machine 155 (referred to in FIG. 2 as a "APB CLK SYNC state machine"), which performs a state process selected based on the first control signals HCLK, HADDR, HWRITE, and HSEL received via the first interface block 151 and the state flag bit STATE_FLAG.

Figure 3:
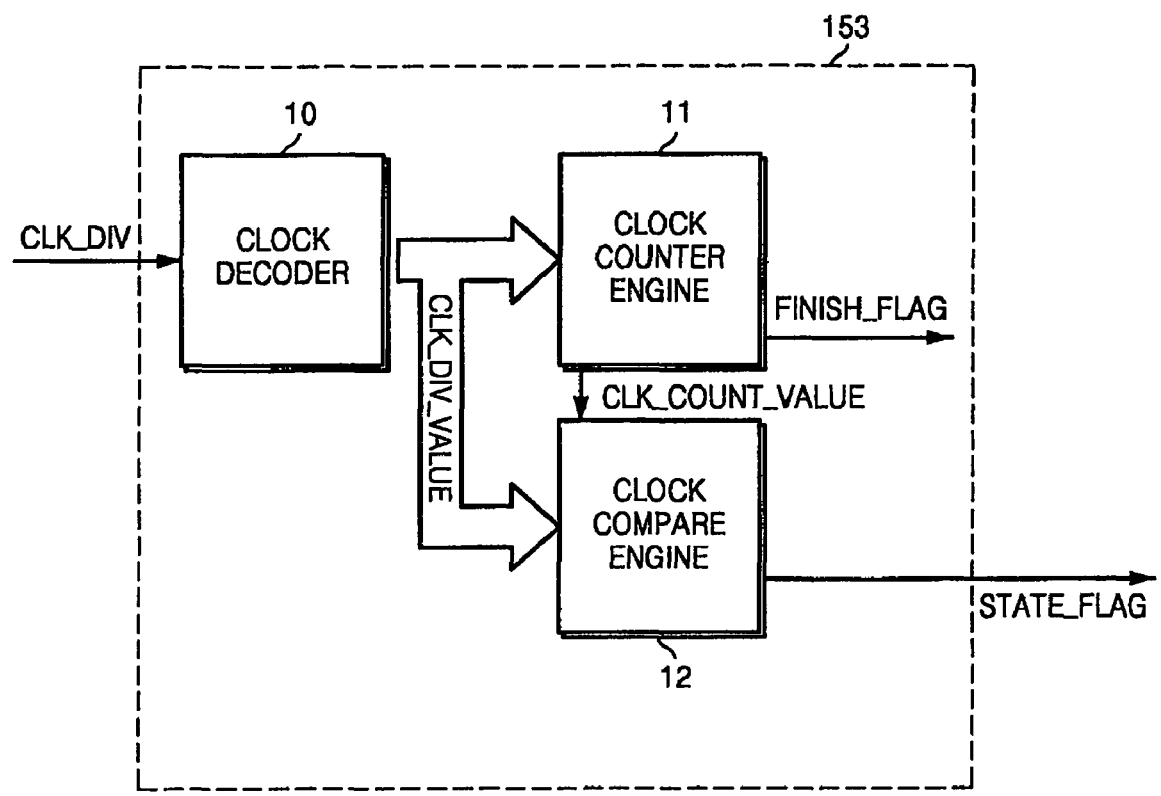
FIG. 3 is a detailed block diagram of the clock detection block illustrated in FIG. 2, according to some embodiments of the present invention.

FIG. 3 is a detailed block diagram of the clock detection block 153 illustrated in FIG. 2, according to some embodiments of the present invention. The clock detection block 153 includes a clock decoder block 10 coupled to a clock counter block 11 and a clock comparison block 12.

The clock decoder block 10 decodes and analyzes the register value CLK_DIV output from the clock monitor 140 and outputs analyzed information, i.e., a decoded register value CLK_DIV_VALUE to the clock counter block 11 and the clock comparison block 12.

The register value CLK_DIV is a value corresponding to a division ratio of the first clock signal to the second clock signal. For instance, when the clock monitor 140 expresses a frequency-divided clock signal in 2-bit information and the register value CLK_DIV is "00", "01", "10", or "11", the decoded register value CLK_DIV_VALUE is "2", "4", "8", or "16", respectively, indicating a ½, ¼, ⅛, or 1/16 frequency-divided clock signal with respect to the first clock signal HCLK. The division ratio corresponding to the decoded register value CLK_DIV_VALUE may be selectively changed by a user, according to application requirements.

The clock counter block 11 receives the decoded register value CLK_DIV_VALUE, counts the first clock signal HCLK, and outputs an indicator flag bit FINISH_FLAG when the decoded register value CLK_DIV_VALUE is the same as a first clock signal count value CLK_COUNT_VALUE. In addition, the clock counter block 11 outputs the first clock signal count value CLK_COUNT_VALUE to the clock comparison block 12. The indicator flag bit FINISH_FLAG is a flag bit for resetting the clock counter block 11 and recounting the first clock signal HCLK.

The clock comparison block 12 receives the decoded register value CLK_DIV_VALUE and the first clock signal count value CLK_COUNT_VALUE output from the clock counter block 11, compares the two values with each other, and outputs the state flag bit STATE_FLAG based on a result of the comparison. The state flag bit STATE_FLAG is for changing the state of the state machine 154.

Figure 4:
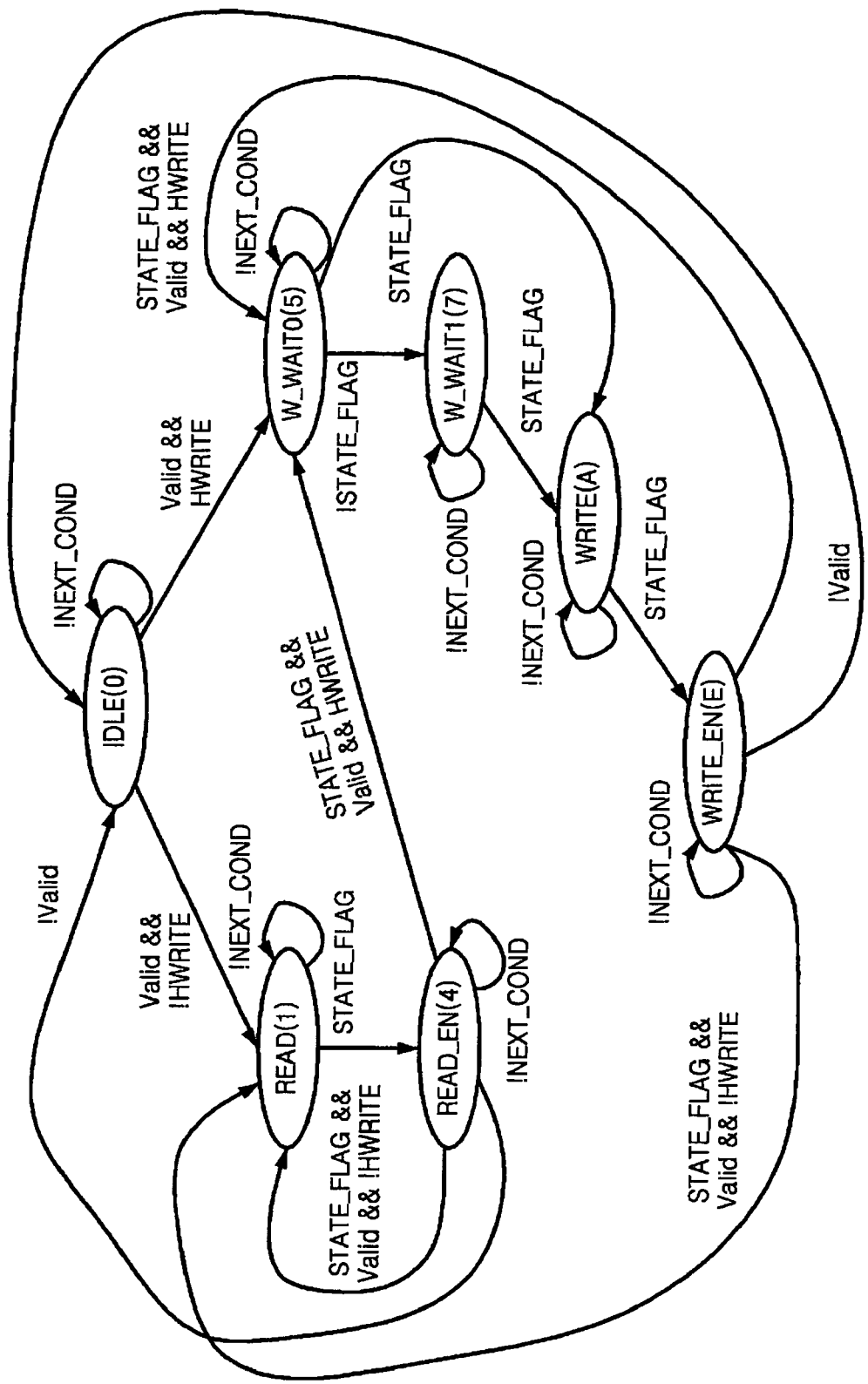
FIG. 4 is a state diagram of the clock synchronous state machine illustrated in FIG. 2, according to some embodiments of the present invention.

FIG. 4 is a state diagram of the clock synchronous state machine 155 illustrated in FIG. 2, according to some embodiments of the present invention. Referring to FIGS. 1 through 4, the clock synchronous state machine 155 performs a state process including multiple operations.

The state process includes an IDLE(0) state, a READ(1) state, a READ_EN(4) state, a W_WAIT0(5) state, a W_WAIT1(7) state, a WRITE(A) state, and a WRITE_EN(E) state. The IDLE(0) state is an initial state. The READ(1) state is a ready-for-read state. The READ_EN(4) state is a read enable state. The W_WAIT0(5) state and the W_WAIT1(7) state are standby states for synchronizing write data in order to write data reliably. The WRITE(A) state is a ready-for-write state. The WRITE_EN(E) state is a write enable state.

In the operations of the state process, the IDLE(0) state transits to the READ(1) state or the W_WAIT0(5) state based on a valid value and a predetermined level of the read/write control signal HWRITE. The read/write control signal HWRITE is output from the CPU 110 in order to determine an operation mode of the bridge circuit 150.

In FIG. 4, a mark "&&" indicates "and". In other words, "&&" indicates that two or more conditions must be satisfied simultaneously for state transition. A mark "!" indicates that an input control signal is false. "FALSE" may be set to a first level (e.g., "0") and "TRUE" may be set to a second level (e.g., "1"). For instance, "Valid && !HWRITE" indicates that state transition occurs at the second level ("1") of the valid value and the first level ("0") of the HWRITE signal.

The valid value "1" indicates that there is data to be read from or written to the peripheral circuits 160 while the valid value "0" indicates that there is no more data to be read from or written to the peripheral circuits 160. The valid value is generated based on a logical operation on the multiple control signals, e.g., HSEL, HREADY, and HTRANS, received from the bridge circuit 150.

In other words, when the read/write control signal HWRITE is at the first level "0", i.e., !HWRITE, the IDLE(0) state transits to the READ(1) state. When the read/write control signal HWRITE is at the second level "1", the IDLE(0) state transits to the W_WAIT0(5) state. The first level "0" of the read/write control signal HWRITE is used as a control signal for performing a read operation while the second level "1" of the read/write control signal HWRITE is used as a control signal for performing a write operation.

The READ(1) state transits to the READ_EN(4) state when the state flag bit STATE_FLAG is generated. The READ_EN(4) state transits to the IDLE(0) state in response to the valid value of "0"; transits to the READ(1) state in response to the valid value of "1", the read/write control signal HWRITE of "0", and the state flag bit STATE_FLAG; and transits to the W_WAIT0(5) state in response to the valid value of "1", the read/write control signal HWRITE of "1", and the state flag bit STATE_FLAG.

The W_WAIT0(5) state transits to the WRITE(A) state in response to the state flag bit STATE_FLAG and transits to the W_WAIT1(7) state when a predetermined period of time (e.g., time corresponding to a cycle of the first clock signal HCLK) lapses without generation of the state flag bit STATE_FLAG. The W_WAIT0(5) state is for having a standby time to receive data input from the bridge circuit 150 based on the first clock signal HCLK having a high frequency.

The W_WAIT1(7) state transits to the WRITE(A) state in response to the state flag bit STATE_FLAG. The W_WAIT1 (7) state is for waiting for timing or synchronization of the control signals of the bridge circuit 150. In other words, since an error occurs when the peripheral circuits 160 connected to the bridge circuit 150 operate when the control signals are not synchronized, the W_WAIT1(7) state is used to hold a standby state until the control signals are synchronized and the state flag bit STATE_FLAG is generated.

The WRITE(A) state transits to the WRITE_EN(E) state in response to the state flag bit STATE_FLAG. The WRITE_EN (E) state transits to the IDLE(0) state in response to the valid value of "0"; transits to the W_WAIT0(5) state in response to the valid value of "1", the read/write control signal HWRITE of "1", and the state flag bit STATE_FLAG; and transits to the READ(1) state in response to the valid value of "1", the read/write control signal HWRITE of "0", and the state flag bit STATE_FLAG.

Figure 5:
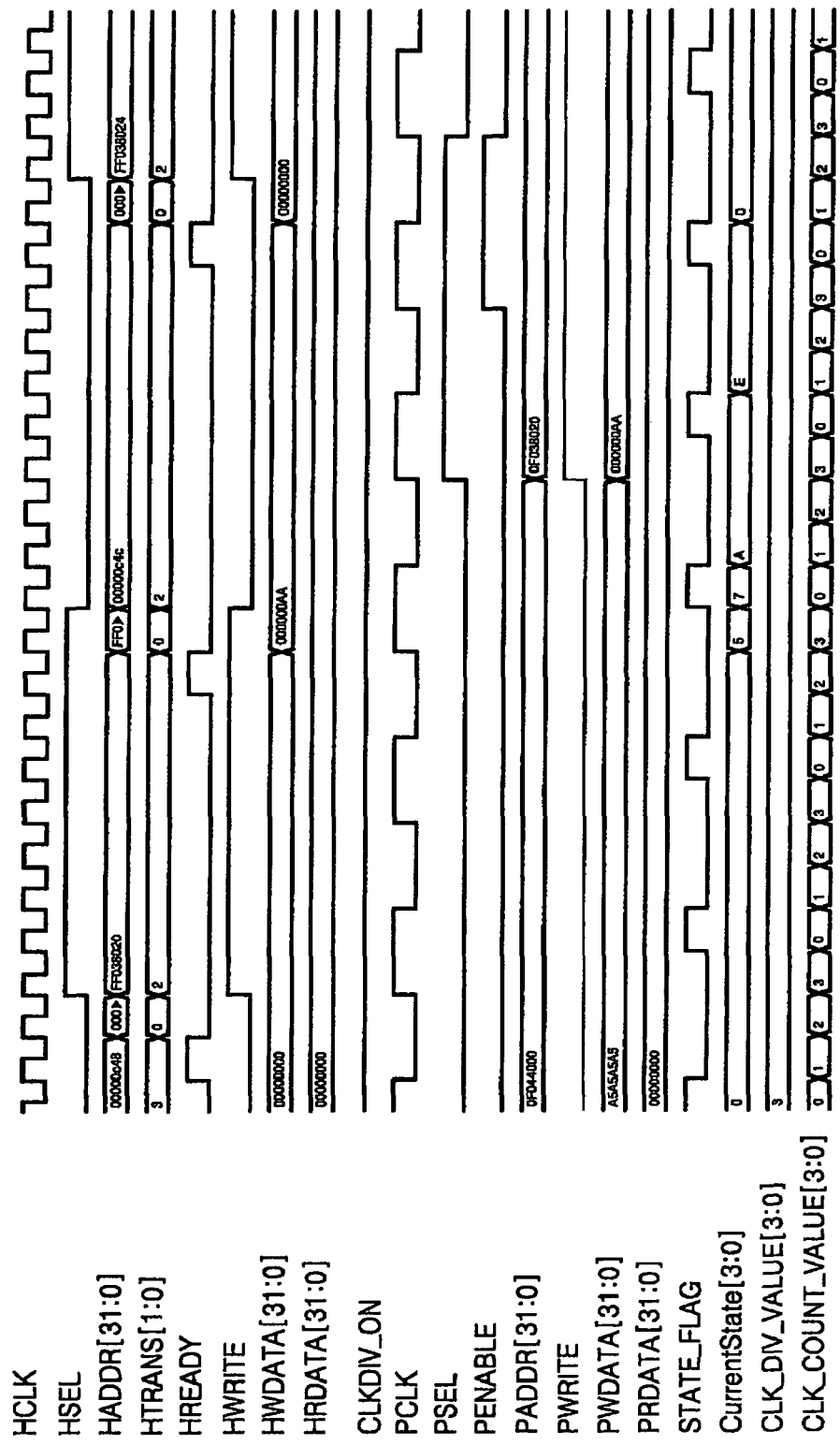
FIG. 5 is a signal timing chart for a write operation of a semiconductor integrated circuit device at a division ratio of 4, according to some embodiments of the present invention.

FIG. 5 is a signal timing chart for a write operation of a semiconductor integrated circuit device at a division ratio of 4, according to some embodiments of the present invention. Referring to FIG. 5, a bridge circuit 150 receives an address signal HADDR of "FF038020" and write data HWDATA of "000000AA", which are output from a CPU. The bridge circuit 150 enables a peripheral circuit selection signal PSEL for selecting one of peripheral circuits and outputs the address signal PADDR "FF038020" and the write data PWDATA "000000AA" to a selected peripheral circuit in response to the second level ("1") of a peripheral circuit read/write control signal PWRITE. At this time, the bridge circuit 150 is in a WRITE(A) state and is ready to write. Then, the bridge circuit 150 transits to the WRITE_EN(E) state in response to the state flag bit STATE_FLAG and performs a write operation.

Figure 6:
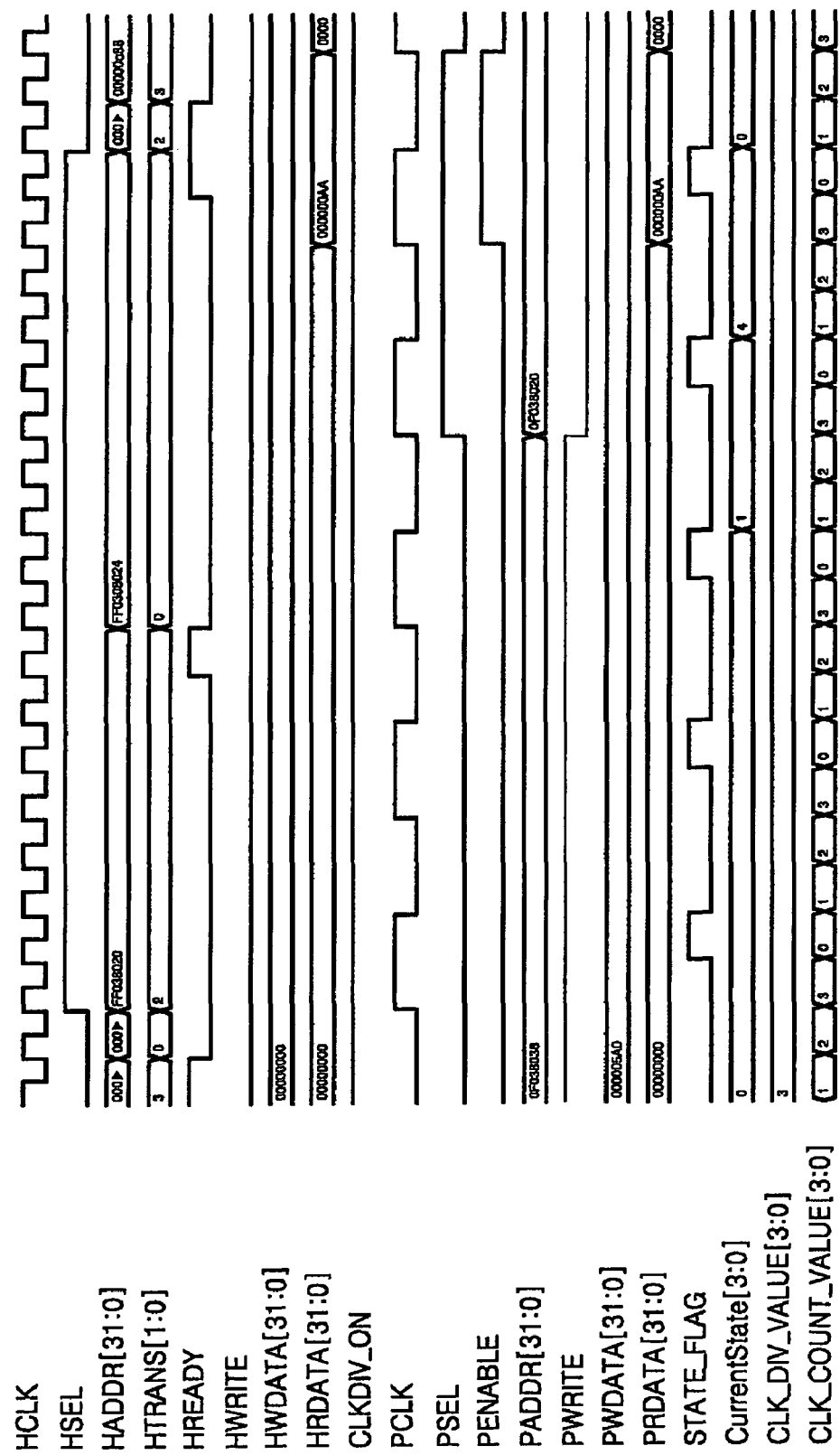
FIG. 6 is a signal timing chart for a read operation of a semiconductor integrated circuit device at a division ratio of 4, according to some embodiments of the present invention.

FIG. 6 is a signal timing chart for a read operation of a semiconductor integrated circuit device at a division ratio of 4, according to some embodiments of the present invention. For clarity of the description, the data written according to the timing chart illustrated in FIG. 5 is repeated.

Referring to FIG. 6, the bridge circuit 150 receives the address signal HADDR of "FF038020" output from the CPU, enables the peripheral circuit selection signal PSEL, and starts the read operation based on the address signal HADDR in response to the first level ("0") of the peripheral circuit read/write control signal PWRITE. At this time, the bridge circuit is in the READ(1) state and is read to read and then transits to the READ_EN(4) state in response to the state flag bit STATE_FLAG. When a strobe signal PENABLE is enabled in the READ_EN(4) state, a peripheral circuit selected by the peripheral circuit selection signal PSEL outputs the data PRDATA of "000000AA", which has been stored in an address corresponding to the received address signal HADDR, to the CPU.

As illustrated in FIGS. 5 and 6, the read and write operations are accurately and smoothly performed according to the state process illustrated in FIG. 4.

As described above, according to some embodiments of the present invention, multiple control signals for controlling multiple peripheral circuits connected to a peripheral bus can be integrated, and reusability of the peripheral circuits can be increased.

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. A bridge circuit comprising:
a first interface block configured to interface with a first bus;
a second interface block configured to interface with a second bus:
a clock detection block configured to receive and decode a register value corresponding to a frequency-divided clock signal and generate a state control signal based on the decoded register value, wherein the clock detection block comprises:
a clock decoder block configured to decode the register value corresponding to the frequency-divided clock signal and output the decoded register value;
a clock counter block coupled to the clock decoder block and configured to receive the decoded register value, count a main clock signal, and output an indicator flag bit when the decoded register value is the same as a main clock signal count value obtained as a result of counting the main clock signal; and
a clock comparison block coupled to the clock decoder block and the clock counter block, and configured to receive and compare the decoded register value and the main clock signal count value and output a state flag bit based on a result of the comparison; and
a state machine coupled to the first interface block, the second interface block and the clock detection block, the state machine configured to receive first control signals via the first interface block and generate second control signals having a clock frequency corresponding to the register value based on the state control signal.

2. The bridge circuit of claim 1, wherein the state machine comprises a clock synchronous state machine configured to perform a state process based on the first control signals and the state flag bit output from the clock detection block.

3. The bridge circuit of claim 1, wherein the indicator flag bit is for resetting the clock counter block.

4. The bridge circuit of claim 1, wherein the state flag bit is for changing a state of the state machine.

5. The bridge circuit of claim 1, wherein the first bus is an advanced high performance bus (AHB) and the second bus is an advanced peripheral bus (APB).

6. A semiconductor integrated circuit device comprising:
a central processing unit (CPU) configured to output first control signals in response to a first clock signal;
a first bus connected to the CPU;
a bridge circuit connected to the first bus;
a second bus connected to the bridge circuit;
at least one peripheral circuit connected to the second bus; and
a clock monitor connected to one of the first bus and the second bus, the clock monitor configured to output a register value corresponding to a second clock signal to the bridge circuit, the bridge circuit being configured to receive the first control signals, generate second control signals based on the register value, and output the second control signals to one of the at least one peripheral circuit via the second bus,
wherein the bridge circuit comprises:
a first interface block configured to interface with the first bus;
a second interface block configured to interface with the second bus:
a clock detection block configured to receive and decode the register value corresponding to the second clock signal and generate state control signals based on the decoded register value, wherein the clock detection block comprises:
a clock decoder block configured to decode the register value corresponding to the second clock signal and output the decoded register value;
a clock counter block coupled to the clock decoder block and configured to receive the decoded register value, count the first clock signal, and output an indicator flag bit when the decoded register value is the same as a first clock signal count value obtained as a result of counting the first clock signal; and
a clock comparison block coupled to the clock decoder block and the clock counter block, and configured to receive and compare the decoded register value and the first clock signal count value and output a state flag bit based on a result of the comparison; and a state machine coupled to the first interface block, the second interface block and the clock detection block, the state machine configured to receive the first control signals and generate second control signals based on the state control signals.

7. The semiconductor integrated circuit device of claim 6, wherein the register value is a division ratio of the first clock signal to the second clock signal.

8. The semiconductor integrated circuit device of claim 6, wherein the at least one peripheral circuit includes at least one of a universal asynchronous receiver/transmitter (UART), a timer, and an analog-to-digital converter (ADC).

9. The semiconductor integrated circuit device of claim 6, wherein the indicator flag bit is for resetting the clock counter block.

10. The semiconductor integrated circuit device of claim 6, wherein the state flag bit is for changing a state of the state machine.

11. The semiconductor integrated circuit device of claim 6, wherein the state machine comprises a clock synchronous state machine configured to perform a state process selected based on the first control signals and the state flag bit output from the clock detection block.

12. The semiconductor integrated circuit device of claim 6, wherein the second clock signal is obtained by dividing the first clock signal by N.

13. The semiconductor integrated circuit device of claim 6, wherein the second control signals are for controlling the peripheral circuits.

14. The semiconductor integrated circuit device of claim 6, further comprising:

a memory block coupled to the first bus and configured to store a program, the program including a sequence of instructions for improving a processing speed of the CPU; and an interrupt controller coupled to the first bus.

* * * * *